United States Patent Office 3,329,066
Patented July 4, 1967

3,329,066
SPINDLE TORQUE AMPLIFIER
David B. Wood III, Cincinnati, Ohio, assignor to The Cincinnati Milling Machine Co., Cincinnati, Ohio, a corporation of Ohio
Filed Oct. 19, 1965, Ser. No. 497,811
6 Claims. (Cl. 90—11)

ABSTRACT OF THE DISCLOSURE

A torque amplifier mechanism in a machine tool spindle having at least two scales of amplification, the mechanism being operable selectively for use of each of the scales of amplification in response to a corresponding range of torque magnitudes to be amplified.

---

It has recently become known that in machine tool operation the rate of tool feed and cut speed should be constantly adjusted during a cutting operation as conditions at the cutting edge of the tool change in order to maintain the most efficient and effective machine operation. One of the major difficulties in implementing this technique now referred to as "adaptive control," is the provision of sensors which provide accurate control signals that reflect the conditions at the cutting edge of the tool. One signal which has been used is spindle torque since it is directly related to the tangential force at the cutting edge of the tool during a cutting operation. Different types of operations result in different levels of force magnitude and therefore it is difficult to provide a torque sensing mechanism which will be effective in more than one type of cutting operation. For example, in face milling, large cutters and low rotational speeds are employed with resulting high torque loads on the spindle, while in end milling, small diameter cutters are used at high speed with light torque loads resulting. Less sensitive detectors are needed in face milling than in the end milling application. Consequently a torque sensor designed for face milling probably will not provide the required signal level output for monitoring an end milling operation while a torque sensor designed for end milling operations can be overstressed and damaged by its use in a face milling operation.

It is therefore an object of this invention to provide a mechanical torque amplifier which can be included in a machine tool spindle and which is selectively adjustable to provide more than one range of amplification so as to be useful in more than one type of cutting operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention utilizes a sensor bar having strain gauges thereon to provide a signal output proportional to the torsional strain in the bar. The full angular twist or windup of the spindle along its entire length is applied to the sensor bar over one or the other of two lengths of the bar, a selection of the one or the other of these lengths of sensor bar being provided so that the torque amplification will match the normal magnitude range of the spindle torque in the particular type of milling operation. A full understanding of the construction and operation of the torque amplifier of this invention can be obtained from the following detailed description in which reference is made to the attached drawings wherein:

Figure 1:
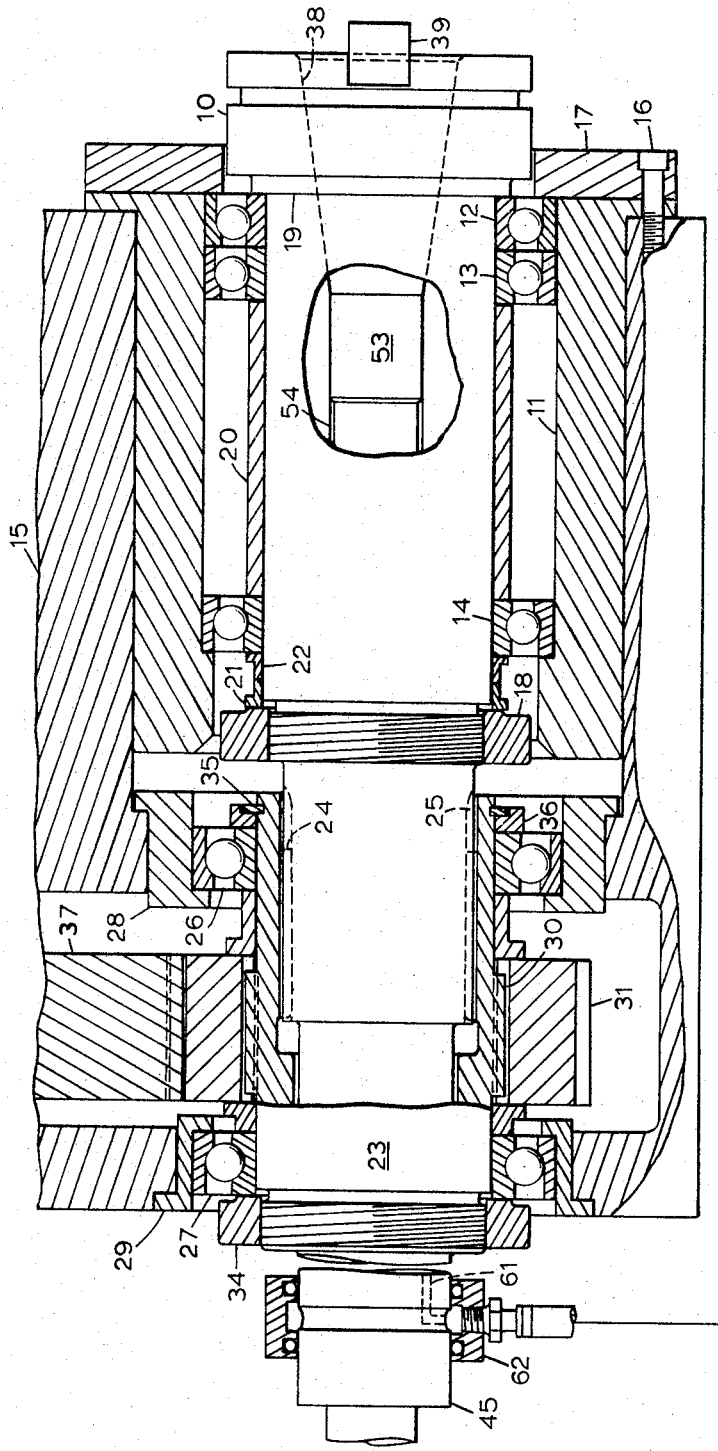
FIG. 1 is a longitudinal showing of a milling machine spindle and carrier, partly in section and partly in elevation.

The specific embodiment of the sensor mechanism of this invention to be described in detail herein is applied in a milling machine spindle mechanism shown in FIG. 1. A spindle 10 is supported for rotation in a sleeve 11 by a set of bearings 12, 13 and 14. The sleeve 11 is fixed in position in a carrier housing 15 by a set of screws 16, only one shown in the section of FIG. 1, which also hold a cover plate 17 in place around the spindle 10. The cover plate 17 functions to close the interior of the mechanism from the outside environment and provides a shoulder against which the outer race of the forward bearing 12 is received. The bearings 12, 13, 14 are held on the spindle 10 between a nut 18 and a shoulder 19 and in axial position by spacers 20, 21, 22. The spindle 10 is rotated by a gear train that includes an internally splined drive member 23 that is received around the spindle 10 at its rearward end. The internal splines 24 of this member 23 mate with external splines 25 formed on the spindle so that a rotational drive is transmitted therebetween. The member 23 is supported in bearings 26, 27 that are each received in bushings 28, 29 in the housing 15. The drive member 23 has external spline teeth 30 that are engaged through an internally splined gear 31 which is axially held in place over the member 23 between spacers 32, 33 which contact against the bearings 26, 27. Thus the gear 31 is both axially and rotatably fixed with respect to the member 23. The member 23 has a nut 34 on one end and a snap ring 35 and spacer 36 on the other end which cooperate with the bushings 28, 29 and bearings 26, 27 to maintain the assembly of the drive member 23 and gear 31 in a fixed axial position within the housing 15. The gear 31 is in mesh with a driving gear 37 that is part of a conventional transmission mechanism and which will cause the gear 31 to be driven at any one of the plurality of predetermined rates that can be individually selected.

The spindle 10 has a socket 38 at its forward end which is provided to receive a conventional milling tool (not shown) and a set of driving dogs 39 are fixed on the forward end face of the spindle 10 to engage and drive the tool in rotation with the spindle 10. The retention of a tool in the socket 38 is by a mechanism such as is shown and described in U.S. Patent 1,904,641 and which mechanism is received directly on the forward end of the spindle 10 to eliminate the need for a drawbolt. The resistance to rotation of the spindle 10, in the form of cutting load forces, is applied only to the forward end of the spindle 10 at the dogs 39 and socket 38. The force tending to rotate the spindle 10 is applied at its rearward end through the spline 25. This tends to produce wind-up or twisting of the spindle 10 from front to rear, the amount of wind-up depending upon the amount of torque required to rotate the spindle 10 against the cutting load.

Figure 2:
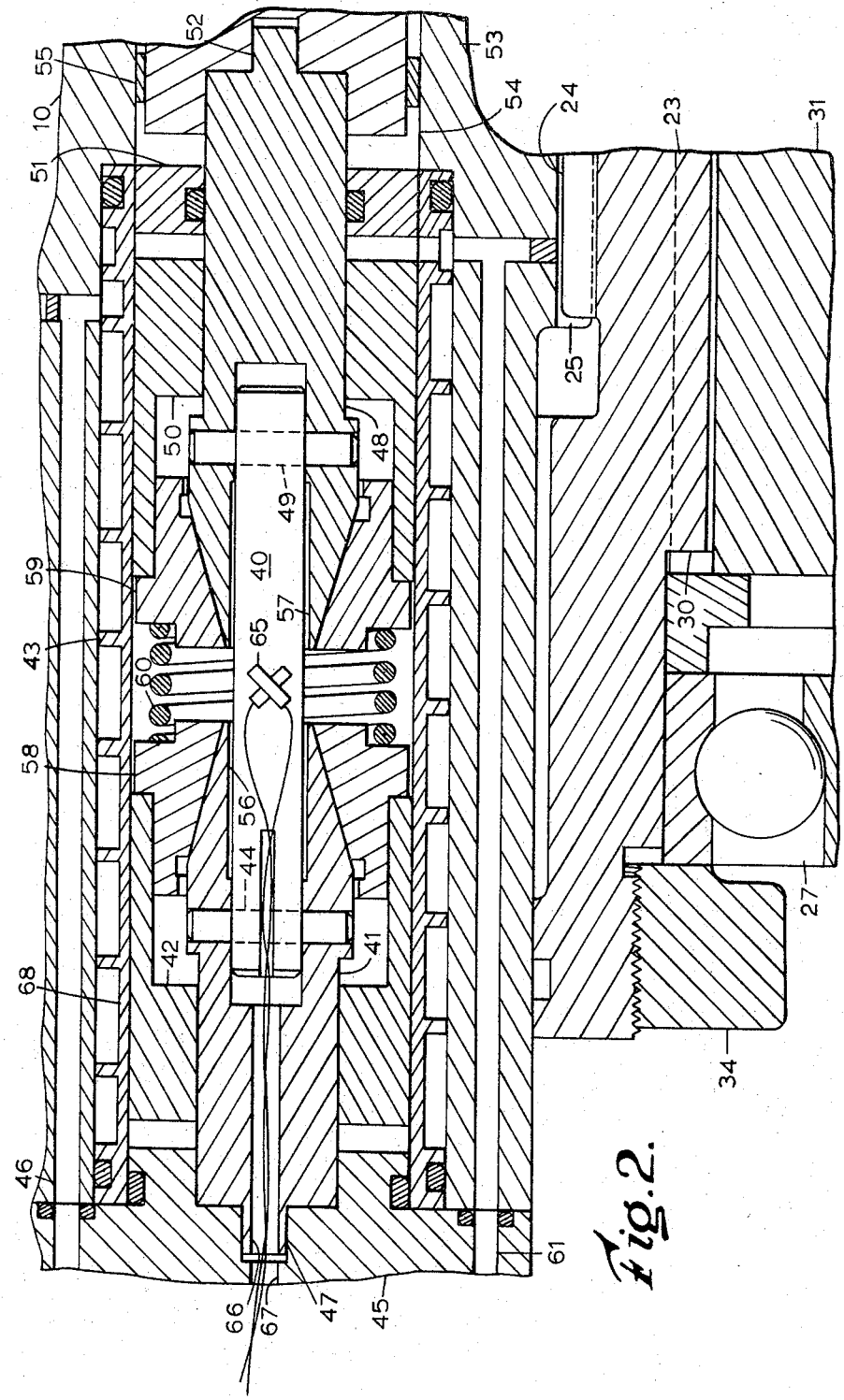
FIG. 2 is a longitudinal section of a part of the spindle mechanism of FIG. 1 on an enlarged scale.

The present invention is included in the spindle 10 and operates to mechanically amplify the amount of torque tranmitted by the spindle 10 and from this mechanical amplification it produces an electrical signal output representative of torque forces. The torque amplifier is shown in detail in the enlarged sectional view of FIG. 2. The torque is sensed from a bar 40 which is connected at its opposite ends to move in rotation with opposite ends of the spindle 10. The rearward end of the sensor bar 40 is received in a gripping member 41 that extends through a piston member 42 that is axially movable in a cylinder sleeve 43 along the member 41. A pin 44 is passed through the gripping member 41 and the rearward end of the bar 40 so that these two members are secured together to move in unison. The rearmost end of the member 41 extends into a socket formed in an end cap 45 that is fixed in place on the end of the spindle 10 by a set of machine screws 46 so that the cap 45 forms an extension of the spindle 10. The cap 45 also holds the cylinder sleeve 43 in place in the spindle 10 and closes its rearward end to provide a confined space between the piston 42 and the cap 45. A tongue extension 47 is formed across the rearward end of the member 41 and this tongue 47 is fitted tightly in a slot formed in the cap 45. Therefore, the gripping member 41 and bar 40 are held fixed against rotation relative to the cap 45 and the rearward end of the spindle 10.

The forward end of the bar 40 is attached to a second gripping member 48 by a transverse pin 49 in the same manner as the rearward end is attached in the gripping member 41. This second gripping member 48 is also received through a piston member 50 that is axially slidable in the cylinder 43 along the member 48 and passes though a cap 51 secured at the forward end of the cylinder sleeve 43 by welding or other permanent means. The cap 51 closes off the forward end of the cylinder 43 to provide a confined space between the piston 50 and the cap 51. The forward end of the gripping member is provided with a transverse tongue 52 that is tightly fitted into a mating slot across the rearward end of a bar member 53. The bar 53 is losely received at its rearward end in a central opening 54 extending longitudinally through the spindle 10. A small bushing 55 is provided between the bar 53 and spindle 10 to hold the bar in the center and to prevent its lateral movement although the bar 53 is freely rotatable therethrough. The bar 53 extends to the forward end of the spindle 10 to a position at the bottom of the socket 38 where it is attached in a fixed manner such as by welding so that the forward end of the bar 53 is only movable with the forward end of the spindle 10.

The gripping member 41 and 48 and the bar 53 all have a stiffness several times the stiffness of the sensor bar 40. Therefore, in effect, the rearward end of the sensor bar 40 is fixed to the rearward end of the spindle 10 while its forward end is fixed to the forward end of the spindle 10. Therefore the relative rotational movement between the ends of the spindle 10 under load is reproduced between the points at which the bar 40 is attached to the gripping members 41, 48. Therefore the twist or angular wind-up of the spindle 10 will be evidenced by a much more severe twist or wind-up strain in the relatively short bar 40.

The torque amplification of the present invention can be selected in one of two ranges of amplification. This is accomplished by shortening the length of the bar 40 to which the windup of the spindle 10 is applied. For this purpose, each of the gripping members 41, 48 has a split and tapered collet tip 56, 57 by which it can be made to grip the bar 40 near the center portion thereof. The collet tips 56, 57 are caused to close and grip the bar by the axial movement of a pair of actuator members 58, 59 each having a tapered interior that fits over the tips 56, 57, respectively. A stiff coil spring 60 is compressed between the members 58, 59 to spread them apart and close the collet tips 56, 57 onto the bar 40 so that its effective length is very short and severe strain is created in the bar for a relatively small strain along the length of the spindle 10.

A fluid line 61 is provided in the spindle 10 from a fluid commutator unit 62 on the rear of the spindle 10 and it is by means of this line that fluid can be supplied simultaneously to the spaces between the end caps 45, 51 and the piston member 42, 50, respectively. When fluid under high pressure is transmitted through the line 61, forces are created that move the pistons 42, 50 toward one another. Since the pistons 42, 50 each engage against one of the actuator members 58, 59, these are forcefully moved together against the bias force of the spring 60 to compress it and cause the tips 56, 57 to be freed from forceful engagement with the bar 40. The effective length of the bar 40 is its length between the pins 44, 49 and therefore for any given stress thereon, a less severe strain is produced than when the collets 56, 57 grip the bar and the short effective length is provided. This provides two ranges of strain amplification in the mechanism and one or the other can be conveniently selected.

The two ranges of amplification are selectively provided through operation of a solenoid valve 63 that connects the fluid commutator 62 either to return pressure or to high pressure from a pump 64. The operation of the valve 63 can be made to depend on the speed range in which the spindle 10 is selected to rotate. Normally, during high speed rotation, the torque load on the spindle 10 is less and therefore a higher amplification is required to provide the required torque control signals. Therefore, the solenoid valve 63 is deenergized to connect return pressure to the line 61 to allow the collet tips 56, 57 to securely grip the bar 40 and shorten its effective length. When low speed ranges of rotation are selected, the cutting forces and the resulting spindle torque are high and therefore less amplification is required to produce a usable control signal. The valve 63 is then energized to connect the high fluid pressure from the pump 64 to the line 61 whereby the collets 56, 57 are released and the effective length of the bar 40 is increased.

The strain in the bar 40 is detected by conventional strain gauges 65 arranged in an electrical bridge and cemented onto the bar 40 at its center. The leads for the gauges 65 are carried out from the mechanism through an opening 66 in the gripping member 41 to an opening 67 in the cap 45 where they connect with an electrical commutator, not shown, on the rearward end of the spindle cap 45. Therefore, the gauges, in combination with the described mechanical torque amplifier will produce the electrical control signals proportional to the spindle torque in one or the other of two sources of amplification. To make these signals relatively free of distortion due to temperature changes, the cylinder 43 is provided with a spiral groove 68 along its outer surface, and this with the spindle 10 defines a fluid path through which cooling fluid can be circulated. The cooling fluid is supplied from a fluid commutator, not shown, similar to the one 62 shown but with an inlet and outlet connection, there being connected through ports, not shown, to the two ends respectively of the groove 68.

What is claimed is:
1. In a machine tool spindle, a torque amplifier comprising in combination:
   (a) a sensor bar received inside said spindle and having a length and rigidity less than the length and rigidity of the spindle,
   (b) first means for rigidly securing one and the other of first spaced locations on said sensor bar to rotate with one and the other ends, respectively, of the spindle,
   (c) additional means selectively operable for rigidly securing said sensor bar at spaced locations other than said first locations to rotate with the respective ends of the spindle to change the length of said sensor bar between locations of securement, and
   (d) means for producing a signal output proportional to the torque strain in said sensor bar between locations of securement.

2. The machine tool spindle mechanism of claim 1 wherein:
   (a) said first means for securing is a pair of permanent connections between one and the other ends of said sensor bar and one and the other ends of said spindle, respectively, and
   (b) said additional means for securing is located intermediate to the ends of said sensor bar and is operable to fix closely spaced locations thereof to rotate with the ends of the spindle.

3. The machine tool spindle mechanism of claim 2 wherein:
   (a) said additional means is a pair of collets contractible to grip said sensor bar and fixed to rotate with one and the other ends, respectively of the spindle.

4. The machine tool spindle mechanism of claim 1 wherein:
   (a) said sensor bar is located and axially oriented inside the spindle at one end thereof,
   (b) a connecting member having a rigidity greater than said sensor bar is fixed to the other end of the spindle and extends through the spindle toward said one end thereof where said sensor bar is located, and
   (c) both of said first and additional means secure portions of said sensor bar between said one end of the spindle and said connecting bar.

5. The machine tool apparatus of claim 4 wherein:
   (a) a pair of gripper members are provided and fixed to rotate with one end of said spindle and said connecting bar, respectively,
   (b) said first means for securing is a permanent connection between the ends of said sensor bar and said gripper members,
   (c) said additional means for securing is a pair of contractible collets formed integrally with the respective gripper members and extending around said sensor bar to locations thereon between the permanent connections, and
   (d) said additional means further includes means for contracting said collets to grip said sensor bar and for selectively opening said collets to release said sensor bar.

6. The spindle apparatus of claim 5 wherein:
   (a) said means for contracting and opening said collets includes an axially extending cylinder formed in the spindle,
   (b) said sensor bar and gripper members are received through said cylinder,
   (c) means are provided in said cylinder for holding each of said collets contracted simultaneously,
   (d) a pair of pistons are slidably received in said cylinder to operate against said means for holding said collets contracted when fluid under pressure is applied to each end of said cylinder to open said collets, and
   (e) means are provided for selectively connecting fluid under pressure to the ends of said cylinder.

No references cited.

WILLIAM W. DYER, Jr., *Primary Examiner.*

G. A. DOST, *Assistant Examiner.*